United States Patent
Charlet et al.

(10) Patent No.: US 8,320,764 B2
(45) Date of Patent: Nov. 27, 2012

(54) COMBINED PHASE AND POLARIZATION MODULATION FOR OPTICAL COMMUNICATION

(75) Inventors: Gabriel Charlet, Nozay (FR); Jeremie Renaudier, Nozay (FR)

(73) Assignee: Alcatel Lucent, Paris (FR)

( * ) Notice: Subject to any disclaimer, the term of this patent is extended or adjusted under 35 U.S.C. 154(b) by 989 days.

(21) Appl. No.: 12/321,081

(22) Filed: Jan. 14, 2009

(65) Prior Publication Data

US 2009/0190926 A1 Jul. 30, 2009

(30) Foreign Application Priority Data

Jan. 29, 2008 (EP) .................................. 08290078

(51) Int. Cl.
*H04B 13/02* (2006.01)
(52) U.S. Cl. ........................................................ 398/105
(58) Field of Classification Search .................. 398/185
See application file for complete search history.

(56) References Cited

U.S. PATENT DOCUMENTS

| 6,304,353 | B1 | 10/2001 | Gehlot | |
|---|---|---|---|---|
| 2005/0100347 | A1* | 5/2005 | Yano | 398/188 |
| 2007/0147850 | A1 | 6/2007 | Savory et al. | |

FOREIGN PATENT DOCUMENTS

WO  WO 9118455  11/1991

* cited by examiner

*Primary Examiner* — Patrick Stafford
(74) *Attorney, Agent, or Firm* — Carmen Patti Law Group, LLC

(57) ABSTRACT

The invention relates to a modulation scheme for optical communication, in particular for fiber optics communication. According to invention, an optical signal is generated, both phase and polarization of which modulated in dependency of the data to be transmitted. Preferably, the generated optical signal comprises a sequence of symbols (22a-22k) and each symbol (22a-22k) has one of two different phase states and one of two different orthogonal polarization states. Bits of the data stream to be transmitted are encoded both in the phase state of a symbol (or in the phase state difference between subsequent symbols) and in the polarization state of the symbol (or in the polarization state difference between the subsequent symbols).

20 Claims, 3 Drawing Sheets

COMBINED PHASE AND POLARIZATION MODULATION FOR OPTICAL COMMUNICATION

CROSS REFERENCE TO RELATED APPLICATION

This application claims the benefit of European Application, Serial No. 08290078.8 filed Jan. 29, 2007, entitled Combined Phase And Polarization Modulation For Optical Communication.

The invention relates to optical data communication, in particular to a modulation method for use in optical communication.

For next-generation optical WDM (wavelength division multiplexing) communications systems, 40 Gb/s channels at a 50 GHz grid are targeted (in the application the term "40 Gb/s" comprises both the data rate of OC-768/SDM-256 without forward-error-correction and the increased data of OC-768/SDM-256 with forward-error-correction). Currently focused modulation schemes which provide 40 Gb/s channels and which are compatible with a 50 GHz grid are not capable of reaching long transmission distances because of their insufficient tolerance to linear and/or non-linear impairments.

Impairments due to linear effects (linear impairments) are mostly caused by chromatic dispersion (CD), polarization mode dispersion (PMD) and optical noise.

Impairment due to non-linear effects (non-linear impairments) occur in case of utilizing high light intensities for signal transmission. The refractive index of optical materials increases with increasing intensity, resulting in a non-linear behavior of the material. Of the non-linear effects, the most dominant effects are self phase modulation, four-wave mixing and cross-phase modulation. Non-linear interactions between optical noise and the signal (called non-linear phase noise) or between two polarizations of a signal can also be detrimental.

Three modulation formats are currently in focus for next-generation 40 Gb/s channels arranged in the 50 GHz grid of existing optical networks: DQPSK (differential quadrature phase-shift keying), coherent PDM-QPSK (polarization division multiplexing with quadrature phase-shift keying per polarization) and PSBT (phase-shaped binary transmission).

Despite their high tolerance to linear impairments, DQPSK and coherent PDM-QPSK have low and very low tolerance to non-linear impairments, respectively. This is mainly caused by the small phase distance of $\pi/2$ between the phase states in case of DQPSK and PDM-QPSK and the use of polarization multiplexing in case of PDM-QPSK.

PSBT shows medium tolerance to non-linear impairments but suffers from low tolerance to linear impairments, mainly optical noise and PMD.

US 2005/0185968 A1 discloses a method for transmitting alternate-polarization phase-shift-keyed data. Here, the polarization of an optical signal is data independently alternated to reduce non-linear penalties.

In light of said drawbacks of currently investigated modulation schemes for next-generation WDM systems, it is an object of the invention to provide a modulation method which is tolerant to both linear and non-linear impairments and in particular suited for 40 Gb/s channels while remaining compatible with the existing 50 GHz grid. It is a further object of the invention to provide a transmitter and a receiver providing corresponding modulation and demodulation capability, respectively. It is still a further object of the invention to provide an appropriately modulated optical signal and a waveguide carrying such signal.

These objects are achieved by the modulation method, the receiver, the transmitter, the modulated signal and the waveguide according to the independent claims. Preferred embodiments of the invention are described in the dependent claims.

The first aspect of the invention relates to a modulation method for optical communication, in particular for fiber optics communication. According to the method, an optical signal is generated, both phase and polarization of which modulated in dependency of the data to be transmitted.

By modulating the polarization of the optical signal, data is also encoded in the polarization domain, thereby increasing the spectral efficiency. This provides the opportunity to reduce the data rate associated to phase modulation (in case a constant overall data rate of e.g. 40 Gb/s is targeted). Therefore, phase modulation schemes (in addition to polarization modulation) with less phase states (e.g., 2 phase states) compared to DQPSK or QPSK may be used. Alternatively, the rate of the phase modulation may be reduced. Both results in a higher tolerance against non-linear impairments compared to DQPSK and QPSK.

In contrast to polarization multiplexing used in PDM-QPSK for doubling the data rate degrades the tolerance to non-linear impairment. Polarization modulation as used in the invention does not degrade the tolerance to non-linear impairments. In polarization division multiplexing formats like PDM-QPSK the simultaneous presence of two optical fields on the two polarization axes results in non-linear interactions between both multiplexed signal components inducing penalizing non-linear phase distortions. When using polarization modulation instead of polarization division multiplexing, the benefit of doubling the capacity does still exist, however, without said negative effect of non-linear interactions since only one optical field is present at a time. Thus, no (or at least very limited) non-linear interactions will occur between the polarization states.

The generated optical signal comprises a sequence of symbols. Preferably, each symbol has one of at least two different phase states and one of two different orthogonal polarization states. Bits of the data stream to be transmitted may be encoded both in the phase state of a symbol (or in the phase state difference between subsequent symbols) and in the polarization state of the symbol (or in the polarization state difference between the subsequent symbols). Advantageously, the phase state of a symbol encodes at least one bit. Alternatively, in case of differential encoding, the phase state difference between two subsequent symbols encodes at least one bit. Also, the polarization state of a symbol or the polarization state difference between two subsequent symbols encodes one bit.

Preferably, the generated optical signal comprises a sequence of optical pulses, and each pulse corresponds to a symbol. The use of a pulsed optical signal prevents intermediate polarizations between the two orthogonal polarization states when shifting from one polarization state to the other which may degrade the receiver sensitivity.

Advantageously, only two phase states are used, which are separated by essentially $180°=\pi$, i.e., binary phase-shift keying (BPSK) is used. Such large phase difference of 180° between the symbols ensures a better tolerance to non-linear impairments compared to other phase-shift keying schemes having a higher number of states and thus a smaller phase difference. E.g., QPSK or DQPSK have 4 phase states and a small phase distance of $90°=\pi/2$. Thus, BPSK is used to benefit from a large tolerance to non-linear impairments, whereas polarization-shift keying is used to increase the spectral efficiency. By avoiding polarization division multiplexing, the large tolerance of BPSK to non-linear impairments is maintained since essentially no non-linear interactions occur between the polarization states.

For generating the optical signal, the phase of an optical wave is modulated in dependency of a first data stream (e.g., a first 40/2 Gb/s=20 Gb/s data stream in case of a 40 Gb/s data channel). Further, the polarization of an optical wave is modulated in dependency of a second data stream (e.g., a second 40/2 Gb/s=20 Gb/s data stream in case of a 40 Gb/s data channel).

Preferably, both "sub-modulations" are performed one after another, wherein the subsequent modulation is applied to the optical signal resulting from the prior modulation. This may be carried out by connecting two modulators in series. Preferably, polarization modulation is applied to an optical signal being already phase modulated, i.e., a polarization modulator is connected downstream of a phase modulator. For separating the optical signal into pulses as discussed above, a return-to-zero (RZ) pulse carver modulator may be used to feed the series connection of both modulators or to modulate a signal already phase and/or polarization modulated. Preferably, the RZ pulse carver modulator is located upstream of the polarization modulator.

It should be noted that basically the above mentioned embodiments can be arbitrarily combined. Furthermore, it should be noted that the disclosure of the invention also covers other claim combinations than the claim combinations which are explicitly given by the back references in the dependent claims, i.e., the claims can be basically combined in any order.

A second and third aspect of the invention relate to a transmitter and a receiver for an optical data transmission system, in particular for a fiber optics communication system. The transmitter has modulation means to generate an optical signal as modulated according to the first aspect of the invention, i.e., both phase and polarization of the signal are modulated in dependency of the data to be transmitted. The receiver is configured to receive such optical signal. Further, the receiver has demodulation means configured to demodulate such signal. The above remarks related to the method and its preferred embodiments are basically also applicable to the transmitter and receiver.

Advantageously, the receiver is a coherent receiver using digital signal processing. This allows for a large tolerance to linear impairments (CD and PMD) which can be fully compensated by coherent detection.

Preferably, the symbols of the optical signal exhibit two orthogonal polarization states and the receiver comprises polarization demultiplexing means configured to demultiplex a received signal into a first signal associated to the first polarization state and into a second signal associated to the second polarization state. Thus, the first signal carries the phase information transported in the first polarization axis and the second signal carries the phase information transported in the second polarization axis.

Further, the receiver may comprise polarization decision means, which are located downstream of the polarization demultiplexing means and receive the first and second signals. The receiver is configured to continuously decide the actual polarization state of the received signal. Preferably, this may be done by comparing the actual powers on each polarization axis in order to continuously decide which polarization axis carries the phase information to detect.

Advantageously, the receiver comprises selection means, which are located down-stream of the polarization demultiplexing means. The selection means are configured to select either the first signal (or a signal dependent thereon), or
the second signal (or a signal dependent thereon).

Further, in case of a coherent receiver, the receiver may comprise phase drift estimation means for estimating a phase drift caused by mixing the received optical with the optical local oscillator signal using in a coherent receiver. Such phase drift may occur due to a frequency offset between the frequency of the signal carrier and the frequency of the optical local oscillator signal, resulting in a continuous phase drift. The phase drift estimation means are configured to estimate the phase drift based on processing phase information of the first and second signals. The reason for using both signals is that the signal information is not simultaneously present at the two polarization axes; thus—dependent on the data pattern—there may be no signal on one polarization state during several consecutive bits. Therefore, the estimation of the phase drift may be not proper.

A fourth and fifth aspect of the invention relate to an optical signal being modulated as discussed above and a waveguide carrying such optical signal, respectively. The above remarks related to the modulation method and its preferred embodiments are also applicable to the optical signal and the waveguide.

The invention is explained below in an exemplary manner with reference to the accompanying drawings, wherein FIG. 1 illustrates an embodiment of a polarization and phase modulated optical signal;

In order to be compatible with a 50 GHz grid of existing WDM networks, next-generation 40 Gb/s data formats should aim to increase the spectral efficiency compared to standard on-off modulation as currently used for 10 Gb/s channels. Such increase of spectral efficiency may be obtained by using multi-bit per symbol phase-shift keying, e.g., QPSK or DQPSK, and/or by using polarization division multiplexing (PDM). However, drastic performance degradation is observed when using such formats due to their poor tolerance to non-linear impairments. This is caused by the small phase distance between the phase states (90° in case of QPSK and DQPSK) in case of using multi-bits per symbol phase-shift keying, and caused by non-linear interactions between the two polarization components in case of PDM.

Figure 1:
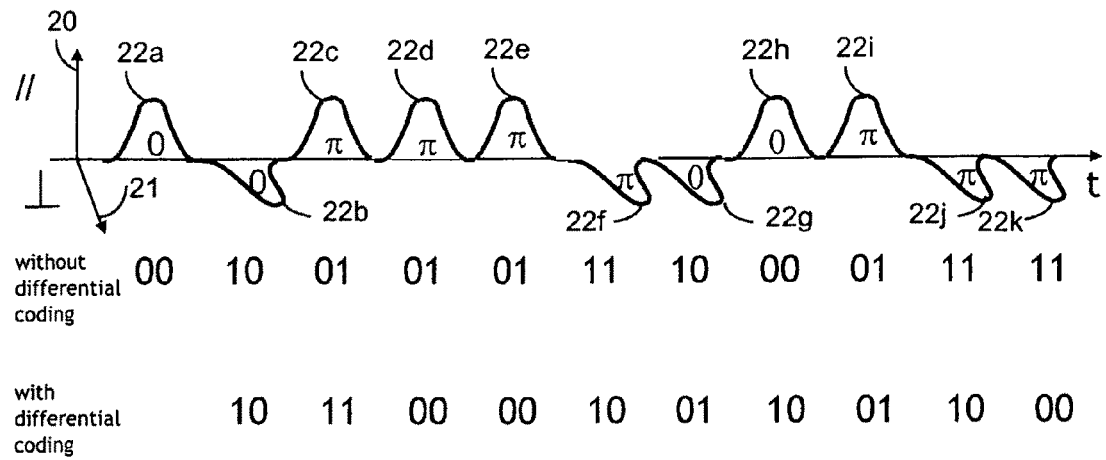

These problems can be overcome by using polarization shift-keying (PolSK) in combination with phase-shift keying, in particular BPSK. FIG. 1 illustrates an embodiment of an optical signal using PolSK-BPSK modulation. Here, the optical field is a function of both phase states and polarization states.

The optical signal comprises a sequence of pulses 22a-22k, each pulse corresponding to a symbol. The pulses are generated by RZ modulation (return-to-zero). Each pulse may be either in a 0-phase state (where the optical carrier has a relative 0° phase shift during the pulse length) or in a c-phase state (where the optical carrier has a relative 180° phase shift during the pulse length). In FIG. 1 the phase states of the pulses are marked by "0" for the 0-phase state and by "π" for the π-phase state.

Further, each pulse may be either in a first polarization state, leading to intensity in the direction of the first polarization axis 20, or in a second polarization state, leading to intensity in the direction of the orthogonal second polarization axis 21.

In case of non-differential coding, each pulse carries 2 bits of information. One bit of each two-bit word is encoded by the polarization state of a pulse, whereas the other bit of each 2-bit word is encoded by the phase state of the pulse. E.g., the first polarization in the direction of polarization axis 20 corresponds to a logical "0" and the second polarization in the direction of polarization axis 21 corresponds to a logical "1". Further, e.g., the 0-phase state corresponds to a logical "0" and the π-phase state corresponds to a logical "1". When using this convention and also specifying that the first bit of a 2-bit word is polarization encoded and the second bit of a 2-bit word is phase encoded, the pulses correspond to the upper sequence of 2-bit words shown directly below the pulses in FIG. 1. E.g., the pulse 22b has a O-phase state and is in the second polarization state, leading to the 2-bit word "10".

In case of differential coding, one bit of each 2-bit word is encoded by the phase difference or change between two subsequent pulses (differentially-encoded BPSK), whereas the other bit is encoded by the polarization difference or change between two subsequent pulses (differentially-encoded PolSK). Thus, when decoding, both the phase states and the polarization states of two subsequent pulses are compared. It is not necessary to detect the phases of both subsequent pulses and compare both phases but only to detect the phase difference between subsequent pulses; this is called differentially-coherent detection of differentially-encoded BPSK, or short DBPSK (differential BPSK), see "Digital communications", B. Sklar, $2^{nd}$ edition, Prentice Hall, paragraph 4.5.1. Analogously, it is not necessary to detect the absolute polarization states of both subsequent pulses and to compare both polarization states but only to detect the polarization difference between subsequent pulses; this may be called differentially-coherent detection of differentially-encoded PolSK, or short DPolSK (differential PolSK).

E.g., a change of the polarization between two subsequent pulses corresponds to a logical "1", whereas two subsequent pulses having the same polarization correspond to a logical "0". Further, one may specify that the change of the phase state between two subsequent pulses corresponds to a logical "1", whereas two subsequent pulses having the same phase state corresponds to a logical "0". When using this convention and also specifying that the first bit of a 2-bit word is polarization encoded and the second bit is phase encoded, the encoded information of the pulses correspond to the lower sequence of 2-bit words in FIG. 1. Please note that in FIG. 1 each 2-bit word in the lower sequence is written below the respective second pulse of two subsequent pulses. E.g., pulses 22a and 22b have a different polarization state and have the same phase state, leading to the 2-bit word "10".

It should be noted that differential and non-differential coding may be mixed, i.e., the phase may be differentially encoded, whereas the polarization is non-differentially encoded or vice versa.

BPSK (which also comprises differential BPSK=DBPSK) as used for phase encoding in FIG. 1 has only two-phase states with a phase difference of π. Such large phase difference ensures a better tolerance to non-linear impairments compared to multi-bit per symbol phase-shift keying schemes like QPSK. Further, for enabling channel bandwidth compatibility, PolSK instead of PDM is used to avoid detrimental performance degradation caused by the latter since in PolSK only one polarization is used at a time (see FIG. 1). This prevents non-linear interactions between both polarizations as in the case of PDM.

Figure 2:
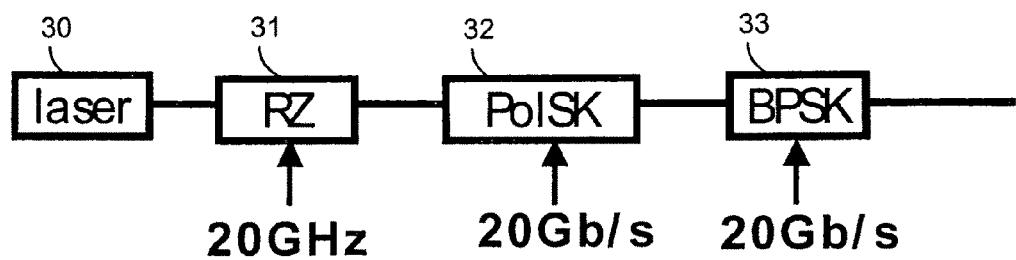
FIG. 2 illustrates an embodiment of a 40 Gb/s transmitter for modulating the signal as shown in FIG. 1.

FIG. 2 shows an embodiment of a 40 Gb/s transmitter for implementing the RZ-PolSK-BPSK modulation format as shown in FIG. 1. The transmitter uses a modulator for polarization shift keying (PolSK modulator 32) and a modulator for phase-shift keying (BPSK modulator 33), with both modulators are optically connected in series.

An optical laser 30 is used to generate an optical carrier. The optical carrier is fed to a RZ pulse carver modulator 31 which is controlled by a 20 GHz clock signal. Controlled by the 20 GHz clock, the RZ modulator 31 turns the optical carrier signal on and off, resulting in an optical signal having 20 G pulses per second (without any information encoding). Generation of a pulsed optical signal is not mandatory and thus the RZ modulator 31 may be omitted. However, in case the output signal of the transmitter is not pulsed, a more or less steep curve of intermediate polarizations between the two orthogonal polarization states occurs when shifting from one polarization state to the other. This may degrade the receiver sensitivity.

Instead of using a 20 GHz signal, a 10 GHz electrical signal may be used to generate 20 GHz optical pulses by biasing the RZ modulator 31 at null transmission point and thus generating 66% wide optical pulses called CS-RZ (carrier suppressed return-to-zero) and having π phase shift between alternate pulses, or by biasing the RZ modulator 31 at its maximum and generating 33% wide optical pulses.

The pulsed optical output signal is fed to the BPSK modulator 33 which modulates the phase of the pulses according to a first 20 Gb/s data stream, the first 20 Gb/s data stream being frequency- and phase-locked to the clock signal.

The output signal of the BPSK modulator 33 is polarization modulated by a second 20 Gb/s data stream in the PolSK modulator 32, with the second 20 Gb/s data stream being frequency- and phase-locked to the 20 GHz clock signal and to the first 20 Gb/s data stream. Each bit of the second 20 Gb/s data stream determines whether the assigned pulse has either a first polarization in the direction of the first polarization axis 20 or a second polarization in the direction of the second polarization axis 21. Such PolSK modulator 32 is available from Versawave (see Versawave's 40 Gb/s polarization modulator under http://www.versawave.com/products/polarization.html"). Further, US 2005/0185968 A1 describes a plurality of embodiments for a polarization modulator. This document is incorporated herein by reference. In US 2005/01859968, e.g. a phase modulator is used for implementing a polarization modulator. When the optical signal is launched into the modulator with its polarization oriented at 45 degrees with respect to the crystal axis, the output polarization is a function of the voltage applied to the phase modulator. The second 20 Gb/s data stream is used for driving the modulator. However, it may be necessary to shift the voltage of the second 20 Gb/s data stream by an offset or to amplify the signal to get a drive voltage compatible with the modulator.

The two 20 Gb/s data streams may be demultiplexed from a 40 Gb/s data signal or each 20 Gb/s data stream may result from multiplexing two 10 Gb/s data streams. One or both 20 Gb/s data streams may be differentially-pre-encoded as in case of using differentially-encoded PolSK and/or differentially-encoded BPSK. For this reason, in FIG. 2 a demultiplexer block 34 is shown, which demultiplexes a 40 Gb/data stream into the two 20 Gb/s data streams. Optionally, the demultiplexer block 34 provides encoding functionality for differentially pre-encoding the 20 Gb/s signals.

It should be noted that the two modulators 32 and 33 may be integrated into a single optical modulator as e.g. discussed in US 2005/0185968.

Figure 3:
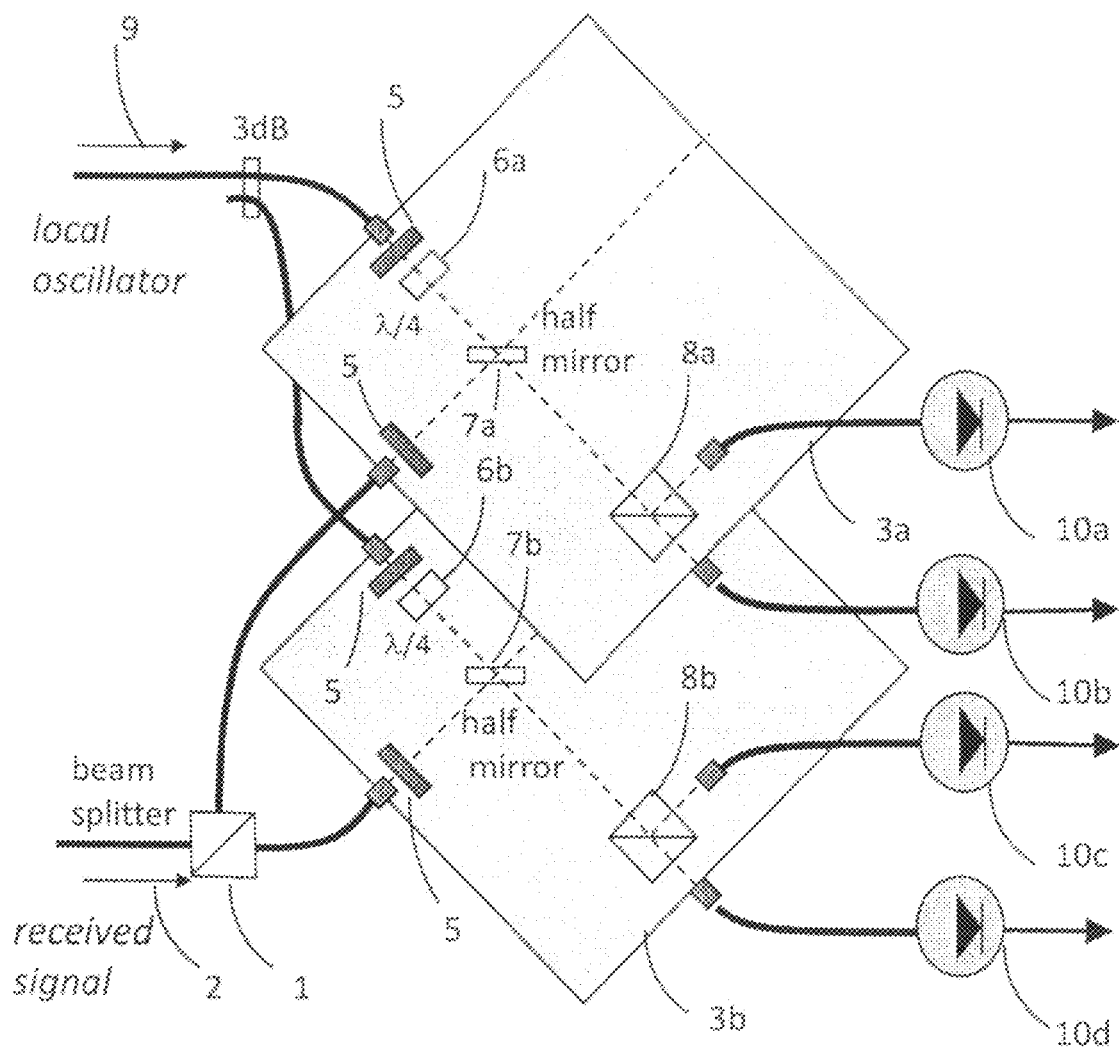
FIG. 3 illustrates an embodiment of the optical part of a coherent receiver for demodulating the signal as shown in FIG. 1.

FIG. 3 shows an embodiment of the optical part of a coherent PolSK-PSK receiver. The receiver is similar to a coherent PDM-QPSK receiver and is configured to generate in-phase and quadrature-phase components (phase-diversity) of the down-converted received signal for two orthogonal polarizations (polarization-diversity).

The receiver comprises a polarization beam splitter (PBS) 1, which splits the received optical signal 2 into a first optical wave and a second optical wave, with the polarizations of the first and second optical waves being orthogonal. The signals of the first and second optical waves typically do not correspond to the signal component in the direction of the first polarization axis 20 and to the signal component in the direction of the second polarization axis 21, respectively.

The first optical wave is fed to a first coherent demodulator 3a, whereas the second optical wave is fed to a second coherent demodulator 3b. Both the first coherent demodulator 3a and the second coherent demodulator 3b receive a local oscillator (LO) signal 9 for superimposing the first optical wave and the second optical wave with the LO signal 9, respectively. Here, intradyne detection is used, i.e., the frequency offset between the carrier frequency of the optical signal 2 and the frequency of the LO signal 9 is within the signal bandwidth (the signal bandwidth is roughly 2·20 GHz). Typically, the frequency offset is a few hundred MHz up to 1 or 2 GHz.

Polarizers 5 at the inputs of the demodulators 3a and 3b can be used to improve the polarization quality. Subsequently to polarizers 5, at the LO input of both demodulators 3a, 3b a λ/4 wave plate 6a, 6b is provided. The wave plates 6a, 6b are used for making the polarization of the LO signal 9 circular, while the signal remains linearly polarized. After passing through half mirrors 7a, 7b for superimposing the LO signal 9 and received signals, PBS 8a, 8b are used for each generating two orthogonal phases. The polarization angle of the signal when hitting half mirrors 7a, 7b is 45° with respect to the principal axis of PBS 8a, 8b.

The four outputs of the two demodulators 3a, 3b are coupled to the inputs of four photodiodes 10a-10d, thereby generating four electrical currents $I_{10a}$, $I_{10b}$, $I_{10c}$, $I_{10d}$. The beat term of current $I_{10a}$ of photodiode 10a corresponds to the quadrature-phase component of a first polarization of the downconverted signal. The first polarization corresponds to the polarization of the first wave as generated by PBS 1. The beat term of current $I_{10b}$ of photodiode 10b corresponds to the in-phase component of the first polarization of the downconverted signal. The beat term of current $I_{10c}$ of photodiode 10c corresponds to the quadrature-phase component of a second polarization of the down-converted signal. The second polarization corresponds to the polarization of the second wave as generated by PBS 1. The beat term of current $I_{10d}$ of photodiode 10d corresponds to the in-phase component of the second polarization of the down-converted signal.

Figure 4:
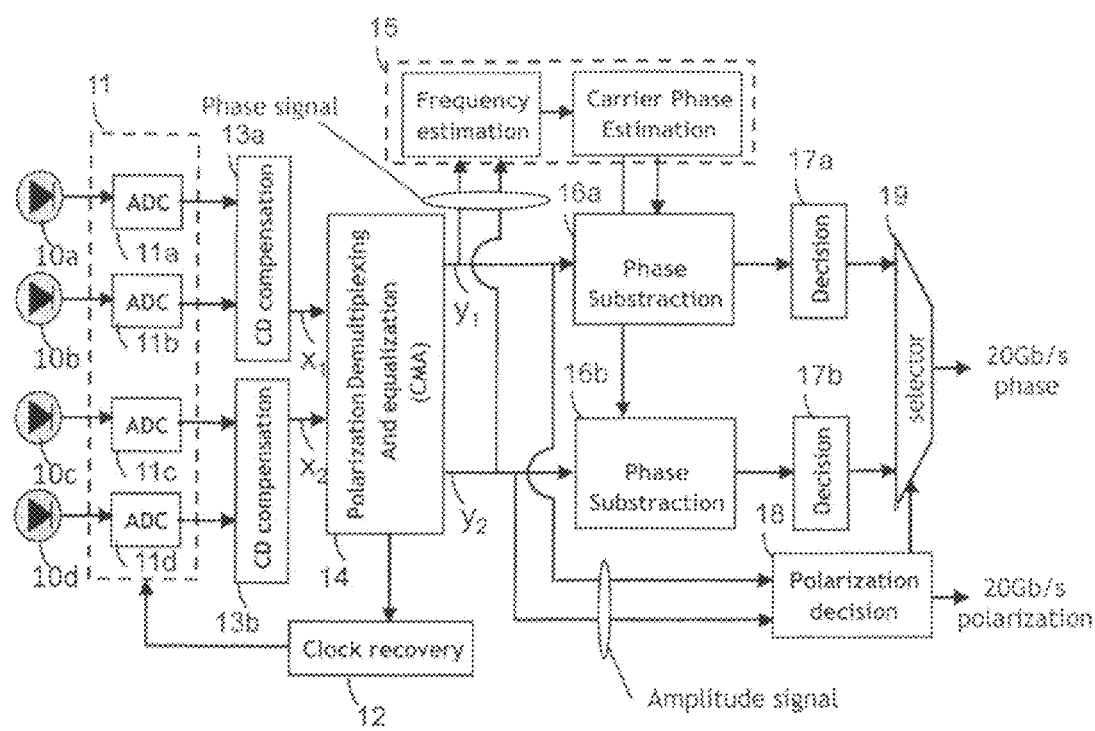
FIG. 4 illustrates an embodiment of the electrical part of the coherent receiver.

As indicated in FIG. 4 illustrating the electrical part of the PolSK-PSK receiver, the downconverted signal components for both polarizations are fed to an ADC block 11 comprising four ADCs 11a-11d for sampling the signal components. The ADCs 11a-11d are clocked by a clock signal supplied by a clock recovery block 12. The frequency of the clock signal determines the sampling rate of the ADCs 11a-11d. The sampling rate either corresponds to the symbol rate (synchronous sampling, i.e., one sample per symbol) or to a multiple of the symbol rate in case of oversampling (e.g., 2 or 4 samples per symbol). Here, the symbol rate is 20 G symbols per second (bit rate divided by the number of bits per symbol). Oversampling allows an almost perfect compensation of CD and PMD while synchronous sampling usually reduces the complexity of the receiver.

In comparison to PDM-QPSK, PolSK-BPSK has twice the ADC sampling rate since the symbol rate of PolSK-BPSK is twice the symbol rate of PDM-QPSK.

The subsequent digital blocks receiving the output signals of the ADC block 11 may be implemented in digital hardware (customized hardware or gate array), in software (in a digital signal processor—DSP) or by a combination of both.

The digital output signals of ADCs 11a-11d are fed in two CD compensation blocks 13a, 13b. CD compensation block 13a is assigned to the in-phase and quadrature-phase signal components of the first polarization, and CD compensation block 13b is assigned to the in-phase and quadrature-phase signal components of the second polarization. The two complex output signals $x_1$, $x_2$ of the CD compensation blocks 13a, 13b are fed to a polarization demultiplexing unit and equalization unit 14.

The polarization demultiplexing and equalization unit 14 is used to rotate the received signal components $x_1$, $x_2$, thereby recovering the signal component assigned to first polarization state (in the direction of the first polarization axis 20) and the signal component assigned to second polarization state (in the direction of the first polarization axis 21).

This basic rotation function of a polarization demultiplexer having output signals $y_1$, $y_2$ (which correspond to the signals components assigned to the first and second polarization states) may be specified as the following filter operation:

$$\begin{pmatrix} y_1(k) \\ y_2(k) \end{pmatrix} = \begin{pmatrix} \cos\theta x_1(k) + \sin\theta x_2(k) \\ -\sin\theta x_1(k) + \cos\theta x_2(k) \end{pmatrix}$$
$$= \begin{pmatrix} \cos\theta & \sin\theta \\ -\sin\theta & \cos\theta \end{pmatrix} \begin{pmatrix} x_1(k) \\ x_2(k) \end{pmatrix}$$
$$= \begin{pmatrix} h_{11} & h_{12} \\ h_{21} & h_{22} \end{pmatrix} \begin{pmatrix} x_1(k) \\ x_2(k) \end{pmatrix}$$

To improve the accuracy of the filter and to use the filter also for signal equalization, the filter may also use information from a plurality of samples.

The tap coefficients $h_{ij}$ of the filter may be computed by means of a constant modulus algorithm (CMA). The CMA is discussed in the document "Digital Equalisation of 40 Gbit/s per Wavelength Transmission over 2480 km of Standard Fibre without Optical Dispersion Compensation", S. J. Savory et al., Proceedings of ECOC 2006, Cannes, France, paper Th2.5.5, September 2006.

Due to the frequency offset and carrier phase fluctuations, the beating of the optical signal 2 with the unlocked local oscillator signal 2 results in a phase drift which needs to be compensated. For compensation, an estimation block 15 and subtraction blocks 16a and 16b are used. The phase information of both signals y1, y2 assigned to both polarization states is used to commonly (i.e., based on information of both polarization states) estimate the phase drift. This helps to improve the estimation process since in case of PolSK-BPSK signal information is not simultaneously present at the two polarization axes as in case of PDM-QPSK; thus—dependent on the data pattern—there may be no signal on one polarization state during several consecutive bits. Therefore, in contrast to a PDM-QPSK receiver which typically comprises two separate estimation blocks (each processing phase information of a single polarization component), here a common estimation algorithm analyzing phase information of both polarization states is preferably used.

For removing the phase drift, first a frequency estimator 15a is used to determine the frequency offset Δf between the carrier of the received signal 2 and the LO signal 9 resulting in a phase shift of $\Delta\theta=2\pi\Delta f\cdot\Delta t$ in a time interval Δt. Subsequently, the carrier phase $\theta_c$ is estimated. Since the optical carrier phase $\theta_c$ varies more slowly than the modulation phase, it is possible to cancel the modulation phase by averaging the received phase information over a plurality of symbol intervals (after compensating the frequency offset). The estimated phase drift (i.e., the phase shift Δθ and the estimated carrier phase $\theta_c$) is fed to a first phase subtraction block 16a and a second phase subtraction block 16b. In phase subtraction block 16a the estimated phase drift is subtracted from the phase of signal $y_1$, and in phase subtraction block 16b the estimated phase drift is subtracted from the phase of signal $y_2$. Instead of having one phase subtraction block per polarization state, two phase subtraction blocks may be provided, one assigned to the frequency estimation process and one assigned to the carrier phase estimation process.

Frequency and carrier phase estimation is also described in the document "Real-time implementation of 4.4 Gbit/s QPSK intradyne receiver using field programmable gate array", A. Leven et al., Electronic Letters, 23 Nov. 2006, Vol. 42., No. 24, with the document's remarks related to frequency and carrier phase estimation being incorporated herein by reference.

Please note that all other phase drifts (due to PMD for example) between the first polarization state and the second polarization state are handled in the polarization demultiplexing and equalization unit 14. Such phase drifts are varying extremely slowly compared to the carrier phase drift (ms compared to ps) and these phase drifts can be efficiently mitigated.

The phase corrected output signals of the phase subtraction block 16a and 17b are fed to two phase decision blocks 17a and 17b, with phase decision block 17a configured to decide the phase in the first polarization state and phase decision block 17b configured to decide the phase in the second polarization state. In order to decide which polarization axis carries the phase information to detect, a polarization decision block 18 is provided which receives amplitude information of signal $y_1$ assigned to the first polarization state and amplitude information of signal $y_2$ assigned to the second polarization state. In the polarization decision block 18 the powers on both polarization axes are compared for continuously deciding the actual polarization state of the received signal. The continuous polarization decisions correspond to the second 20 Gb/s data stream in FIG. 2 fed to PolSK modulator 32. The polarization decisions are also used for controlling which of the phase signal paths has to be selected. Therefore, the polarization decisions are fed to a selector 19 receiving both the decided phase assigned to the first polarization axis and the decided phase assigned to the second polarization axis. The output signal of the selector 19 corresponds to the first 20 Gb/s data stream in FIG. 2 fed to BPSK modulator 33. The 20 Gb/s output signal of the polarization decision block 18 and the 20 Gb/s output signal of the selector 19 are optionally fed to a multiplexer block 40. The multiplexer block 40 multiplexes both 20 Gb/s signals to generate a 40 Gb/s signal corresponding to the 40 Gb/s data signal fed to the demultiplexer block 34 in FIG. 2. In case of differentially-encoded data, the multiplexer block 40 is also configured to decode the differentially-encoded data.

The transmission system as discussed above allows upgrading current systems from e.g. 10 Gb/s to 40 Gb/s without losing tolerance to linear or to non-linear impairments. Thus, the total capacity can be increased by a factor of 4. The tolerance to optical noise is expected to be at the theoretical limit. The tolerance to non-linearity is expected to be very good (more than 6 dB better than 40 Gb/s PDM-QPSK and at least as good as 20 Gb/s DPSK). The coherent receiver uses digital signal processing allowing fully compensation of linear impairments. Thus, a large tolerance to linear impairments (CD and PMD) is obtained. Further, the modulation scheme is compatible with 50 GHz ROADMs (reconfigurable optical add-drop multiplexer) due to the symbol rate of 20 G symbols per second which makes the spectrum width compatible with the optical bandwidth of the ROADM.

The invention claimed is:

1. A transmitter for an optical data transmission system, the transmitter being configured to generate an optical signal, both phase and polarization of which are modulated based on the data to be transmitted,
wherein the generated optical signal comprises a sequence of symbols,
wherein the symbols have one of at least two different phase states and one of two different polarization states,
wherein one of the phase states of the symbols and the phase state difference between two subsequent symbols encodes at least one bit of the data, and
wherein one of the polarization states of the symbols and the polarization state difference between two subsequent symbols encodes one bit of the data, with the bits of the data encoded by phase state or phase state difference of the symbols are different to the bits of the data encoded by the polarization state or polarization state difference of the symbols.

2. The transmitter of claim 1, the transmitter comprising:
means for modulating the phase of an optical wave based on a first data stream; and
means for modulating the polarization of an optical wave based on a second data stream,
wherein the means for modulating the phase are connected to receive an optical wave generated by the means for modulating the polarization, or
the means for modulating the polarization are connected to receive an optical wave generated by means for modulating the phase.

3. The transmitter of claim 2, wherein the transmitter is configured to generate the first and second data streams by demultiplexing a data stream.

4. The transmitter of claim 1, wherein the transmitter comprises:
a phase modulator configured to modulate the phase of an optical wave based on a first data stream; and
a polarization modulator configured to modulate the polarization of an optical wave based on a second data stream.

5. The transmitter of claim 4, wherein the phase modulator and the polarization modulator are connected in series.

6. The transmitter of claim 4, wherein the phase modulator and the polarization modulator are optically connected in series.

7. The transmitter of claim 4, wherein the phase modulator comprises a binary phase-shift keying (BPSK) phase modulator.

8. The transmitter of claim 4, wherein the polarization modulator comprises a polarization shift keying (PolSK) polarization modulator.

9. An optical data transmission system, the system comprising a transmitter and a receiver, wherein the transmitter is configured to generate an optical signal, both phase and polarization of which are modulated based on the data to be transmitted, wherein the generated optical signal comprises a sequence of symbols, wherein the symbols have one of at least two different phase states and one of two different polarization states, wherein one of the phase states of the symbols and the phase state difference between two subsequent symbols encodes at least one bit of the data, wherein one of the polarization states of the symbols and the polarization state difference between two subsequent symbols encodes one bit of the data, with the bits of the data encoded by phase state or phase state difference of the symbols are different to the bits of the data encoded by the polarization state or polarization state difference of the symbols, and wherein the receiver is configured to receive and to demodulate the optical signal.

10. The system of claim 9, wherein the transmitter comprises:
 a phase modulator configured to modulate the phase of an optical wave based on a first data stream; and
 a polarization modulator configured to modulate the polarization of an optical wave based on a second data stream.

11. The system of claim 10, wherein the phase modulator and the polarization modulator are connected in series.

12. The system of claim 10, wherein the phase modulator and the polarization modulator are optically connected in series.

13. The system of claim 10, wherein the phase modulator comprises a binary phase-shift keying (BPSK) phase modulator.

14. The system of claim 10, wherein the polarization modulator comprises a polarization shift keying (PolSK) polarization modulator.

15. The system of claim 10, wherein the transmitter is configured to generate the first and second data streams by demultiplexing a data stream.

16. The system of claim 10, wherein the receiver is a coherent receiver.

17. The system of claim 16, wherein the optical signal has two polarization states and the receiver comprises a polarization demultiplexer configured to demultiplex a received signal into a first signal y1 associated to the first polarization state and into a second signal y2 associated to the second polarization state.

18. The system of claim 16, wherein the receiver further comprises:
 a polarization decision block, downstream of the polarization demultiplexer and configured to continuously decide the actual polarization state of the received signal; and
 a selection block, downstream of the polarization demultiplexer and configured, based on the decision of the polarization decision block, to select one of the first signal y1 and the second signal y2.

19. The system of claim 18, wherein the receiver further comprises a multiplexer for multiplexing
 the continuously decided polarization state or a signal based thereon; and
 the output signal of the selection means or a signal based thereon.

20. The system of claim 16, wherein the receiver further comprises a phase drift estimator for estimating a phase drift caused by superimposing the received optical signal with an optical local oscillator signal, wherein the phase drift estimator is configured to estimate the phase drift based on processing phase information of the first y1 and second y2 signals.

* * * * *